United States Patent [19]

Beadle

[11] 4,218,964
[45] Aug. 26, 1980

[54] LID CONSTRUCTION FOR FERMENTATION CONTAINER

[75] Inventor: Leigh P. Beadle, Chapel Hill, N.C.

[73] Assignee: Specialty Products International, Ltd., Carrboro, N.C.

[21] Appl. No.: 40,960

[22] Filed: May 21, 1979

[51] Int. Cl.³ .............................................. C12C 11/04
[52] U.S. Cl. .................................................... 99/275
[58] Field of Search ................... 99/275, 277.1, 277.2, 99/323.1, 323.2; 215/309, 311

[56] References Cited

U.S. PATENT DOCUMENTS

| | | | |
|---|---|---|---|
| 1,459,704 | 6/1923 | Bennett | 99/275 |
| 1,465,013 | 8/1923 | Krause | 99/275 |
| 1,473,302 | 11/1923 | Leichtfuss | 99/275 |
| 3,492,671 | 1/1970 | Hovey | 99/275 |
| 3,878,962 | 4/1975 | Holbrook | 215/309 |

Primary Examiner—Robert W. Jenkins
Attorney, Agent, or Firm—B. B. Olive

[57] ABSTRACT

A single-stage beer fermentation container has a flexible snap-on lid with improved mounting means for the fermentation lock.

2 Claims, 4 Drawing Figures 4,218,964

LID CONSTRUCTION FOR FERMENTATION CONTAINER

BACKGROUND OF THE INVENTION

1. Field of the Invention

The invention relates to beer fermentation containers and specifically to lid constructions having means for mounting a fermentation lock.

2. Description of the Prior Art

It has been known to ferment small quantities of beer in a single stage using a plastic container with a flexible lid, the outer peripheral edge of which engages the top peripheral edge of the container with a snap-on type action. In this type of container, it has also been the practice to form a hole in the center of the lid and mount the stem of the fermentation lock in this hole. Typically, the hole has been formed with a uniform diameter and by use of an ordinary hand drill, or the like.

In practice, it has been observed that the typical plastic container, when formed with a hole in its center and when subjected to the force of installing the stem of the fermentation lock, will very soon develop cracks and other defects which make the lid unsuitable because of leakage of gas through cracks and the like. Also, the stem of the fermentation lock will often loosen after being installed and carbon dioxide gas formed during the fermentation process will then be allowed to escape around the stem of the fermentation lock rather than through the stem and by bubbling through water in the lock.

The object of the present invention thus becomes to provide an improved mounting arrangement for receiving the stem of the fermentation lock in the typical flexible snap-on type lid which has become popular in single stage fermentation of beer in small quantities. A general object is also to maintain a substantially airtight fit at the snap-on lid connection and also around the air lock stem.

SUMMARY OF THE INVENTION

A beer fermentation container has a flexible snap-on type lid for use in containing carbon dioxide gas formed during fermentation of the beer ingredients within the container. The invention is primarily directed to forming the lid with an off-center aperture molded so as to provide tapered walls and a resilient, annular structure for surrounding and gripping the stem of the fermentation lock. The tendency of the lid to crack around the aperture and for the stem to loosen are minimized.

DESCRIPTION OF THE PREFERRED EMBODIMENT

Figure 1:
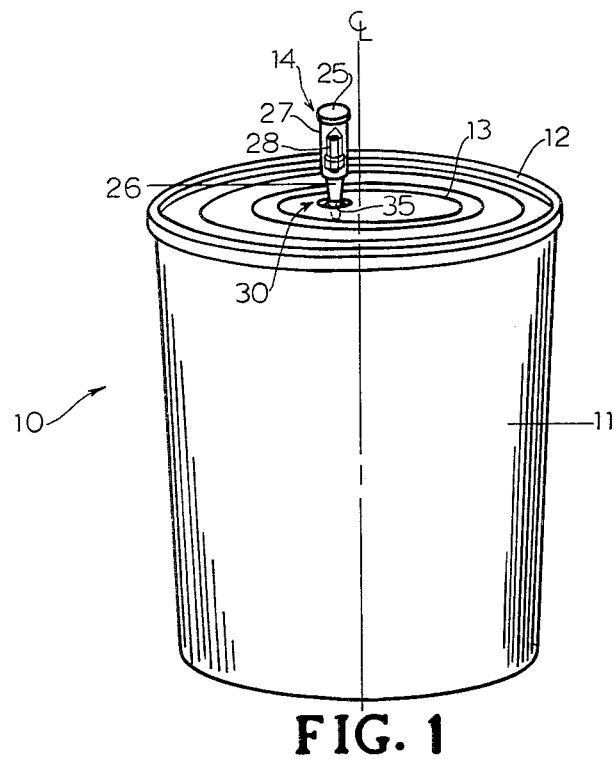
FIG. 1 is a perspective view of a molded plastic container with a fermentation lock secured according to the invention.
Figure 4:
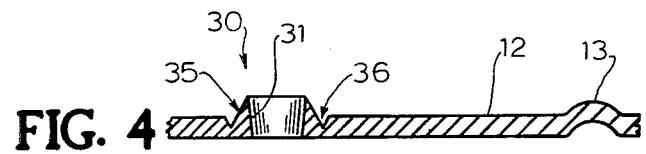
FIG. 4 is an enlarged fragmentary cross-section view similar to FIG. 2 with the stem removed.
Figure 3:
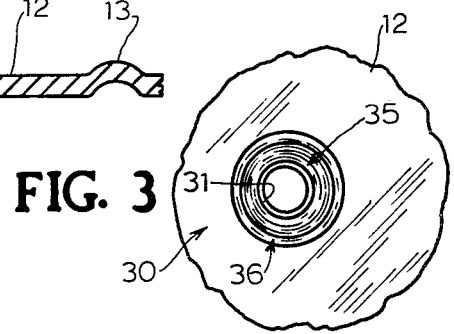
FIG. 3 is a fragmentary top plan view of the stem support formation.
Figure 2:
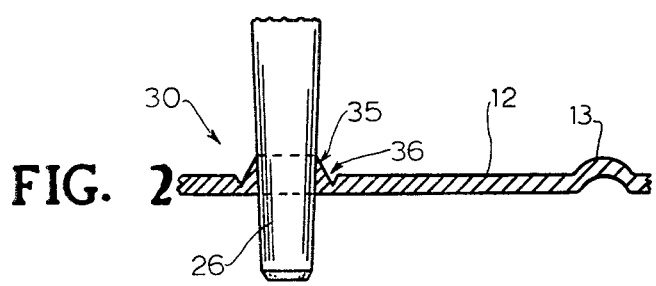
FIG. 2 is an enlarged fragmentary cross-section view illustrating the improved fermentation lock stem mounting formation with the stem.

Referring to the drawings, the single-stage fermentation assembly 10 of the invention comprises an open top container 11, lid 12 and fermentation lock 14. Container 11 is preferably in the form of a molded plastic vessel adapted to receive the flexible, plastic molded lid 12 as a cover with substantially airtight snap-fit connections at the respective mating edges of container 11 and lid 12. Containers of this kind are commonly used for shipment of lard and other materials and when made of FDA food grade polyethylene provides a useful vessel for carrying out single stage fermentation of beer ingredients in a small quantity.

The illustrated air lock 14 is a standard type device used with vessels containing beer during fermentation. Fermentation lock 14 typically includes a removable cap 25, a tapered stem 26 adapted to have one end secured in lid 12 according to the invention and an opposite end extending into the housing 27 which holds the so-called cone member 28. Housing 27 is filled two-thirds full with water, cone 28 is inserted and cap 25 is secured when beer is being fermented in container 11 and with lid 12 secured in place. When carbon dioxide gas is formed during the fermentation, a slight pressure is created inside container 11 and excess gas escapes by bubbling through the water in lock 14 so as to protect the beer ingredients within container 11 from contact with outside air. Cap 25 releases the excess gas.

With the foregoing set forth primarily as background, the present invention is primarily directed to providing a molded support structure 30 in lid 12 for receiving and securing stem 26 of the fermentation lock 14. As indicated in the drawings, the stem support structure 30 includes a tapered hole the depth and slope of which are adapted to conform to the taper of stem 26 and to provide a resilient, gripping action particularly in the area of the raised annular rim portion 35 rising above the level of the top surface of lid 12. As further illustrated in the drawings, it will be noticed that the mentioned annular rim portion 35 is defined by depressed circular groove 36 which provides the annular rim 35 with a type of hinge action such that when stem 26 is manually pushed down into the hole 31 of the stem support structure 30, there is a tendency for the resilient plastic forming the rim portion 35 to grip the surfaces of stem 26 which are in contact therewith. Thus, there is little tendency for the air lock 14 to be pushed out of position or to move out of position when the carbon dioxide gas pressure is created inside the container 11 during the fermentation. Furthermore, by locating hole 31 in an off center position as illustrated in FIG. 1, it has been found that lid 12 will provide an extremely long service life without the introduction of cracks, breaks and the like, as was previously experienced when the stem mounting hole was formed simply by drilling a uniform hole or the like in the center of lid 12.

Also, to be noted is the fact that the stem support construction 30 illustrated in the drawings can be readily molded into lid 12 as part of its normal molding process so that lid 12 becomes immediately serviceable for use as both a cover and a fermentation lock support in the manner described. The triangular cross section rim 35 is readily molded. Typically, lid 12 is also molded with reinforcing ridges 13 and with the mentioned container cooperating substantially airtight snap-fit peripheral edge.

What is claimed is:

1. A single stage fermentation assembly comprising, in combination:

(a) an integral plastic molded container having bottom and side walls and an open top;

(b) an integral plastic molded lid mating said container open top and having a peripheral edge portion detachably secured in a substantially airtight relation to the peripheral top edge portion of said container and having at an off-center location a molded air lock support formation, said air lock support formation providing a vertically-oriented aperture with a downwardly and inwardly directed surrounding tapered surface and as part of said formation a surrounding annular rim rising at least partially above the plane of the top surface of said lid surrounding said formation; and (c) a fermentation air lock of the type having a vertical hollow stem with an outer surface tapering inwardly towards the bottom of the stem and air lock structure above said stem designed to allow escape of fermentation gas through a pool of water contained therein, said air lock support formation being designed to receive, grip and retain said stem in a detachable, substantially airtight, resilient gripping relation with the stem taper mating said formation aperture taper and with said rim being formed to provide a resilient grip around said stem immediately above the top surface of said lid.

2. As assembly as claimed in claim 1 wherein said rim is of triangular cross section.

* * * * *